United States Patent
Hong et al.

(10) Patent No.: US 7,563,030 B2
(45) Date of Patent: Jul. 21, 2009

(54) METHOD OF MAKING FLUID DYNAMIC BEARING

(75) Inventors: Chu-Wan Hong, Tu-Cheng (TW); Jung-Yuan Wu, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 398 days.

(21) Appl. No.: 11/203,612

(22) Filed: Aug. 12, 2005

(65) Prior Publication Data

US 2006/0126978 A1 Jun. 15, 2006

(30) Foreign Application Priority Data

Dec. 10, 2004 (TW) .............................. 93138272 A

(51) Int. Cl.
*F16C 33/00* (2006.01)
*B21D 53/10* (2006.01)
*B21K 1/10* (2006.01)

(52) U.S. Cl. .................... 384/100; 384/115; 29/898.02; 29/898.042; 29/898.054

(58) Field of Classification Search ................. 384/100, 384/107, 114–119, 291, 133; 29/808.02, 29/898.04, 898.041, 898.056, 898.054, 898.058, 29/898.06
See application file for complete search history.

(56) References Cited

U.S. PATENT DOCUMENTS

| | | | | |
|---|---|---|---|---|
| 3,241,893 A | * | 3/1966 | Haller | ................... 29/898.054 |
| 3,324,544 A | * | 6/1967 | Haller | .......................... 29/521 |
| 4,853,053 A | | 8/1989 | Minjolle et al. | |
| 5,043,123 A | * | 8/1991 | Gormanns et al. | .......... 264/113 |
| 5,941,646 A | * | 8/1999 | Mori et al. | ................... 384/100 |
| 6,033,619 A | | 3/2000 | Hattori | |
| 6,105,250 A | * | 8/2000 | Tanaka et al. | ............ 29/898.02 |
| 6,250,807 B1 | * | 6/2001 | Mori et al. | ................... 384/100 |
| 6,769,808 B2 | * | 8/2004 | Shih et al. | ................... 384/114 |
| 6,851,859 B2 | * | 2/2005 | Takehana et al. | ........... 384/100 |
| 7,059,052 B2 | * | 6/2006 | Okamura et al. | ......... 29/898.02 |
| 2003/0102356 A1 | * | 6/2003 | Schwarzbauer | ............. 228/121 |

FOREIGN PATENT DOCUMENTS

| | | | |
|---|---|---|---|
| CN | 1503435 | | 6/2004 |
| DE | 4307560 A1 | * | 9/1994 |
| JP | 59120388 A | * | 7/1984 |
| JP | 10-318250 | | 12/1998 |
| JP | 2002295475 A | * | 10/2002 |
| JP | 2003239004 A | * | 8/2003 |
| JP | 2003260585 A | * | 9/2003 |
| JP | 2004002973 A | * | 1/2004 |
| JP | 2004284947 A | * | 10/2004 |

* cited by examiner

*Primary Examiner*—Marcus Charles

(57) ABSTRACT

A method of making a fluid dynamic bearing (10) includes the flowing steps. At least two bearing parts (10a, 10b) are firstly provided. Each of the bearing parts has its shape corresponding to a portion of the fluid dynamic bearing to be formed. Then, the bearing parts are combined to form a profile of the fluid dynamic bearing to be formed. Finally, the combined bearing parts are sintered to form an integral body. The fluid dynamic bearing is thus obtained.

7 Claims, 8 Drawing Sheets

METHOD OF MAKING FLUID DYNAMIC BEARING

BACKGROUND OF THE INVENTION

1. Technical Feild

The present invention relates to a method of making a fluid dynamic bearing, and more particularly relates to a method of making a fluid dynamic bearing by sintering.

2. Discription of Related Arts

Due to request for low abrasion on rotational elements to achieve an extended life and for low extent of noise, fluid dynamic bearings (FDBs) have been used in fan motors, hard disk drive motors, or the like.

As shown in FIG. 10, in a typical FDB, a rotary shaft 100 is rotatably inserted into a sleeve 200 with a bearing clearance formed between the rotary shaft 100 and the sleeve 200. A plurality of dynamic pressure generating grooves 300 is formed on an inner peripheral surface of the sleeve 200. Lubricating oil is applied to the bearing clearance. A pressure is generated due to the pumping action of the dynamic pressure generating grooves 300 caused by the rotation of the rotary shaft 100. As a result, the rotary shaft 100 rotates in the sleeve 200 without radial contact with the sleeve 200.

In the FDB of FIG. 10, the dynamic pressure generating grooves 300 are V-shaped and also referrer to as herringbone type grooves.

Referring to FIG. 11, another kind of groove is shown, in which the sleeve forms a plurality of step structures 400 in an inner bore thereof. This kind of groove is referred to as step type groove.

In manufacturing the grooves, a tooling head is typically needed to extend into the bore of the sleeve. For example, in manufacturing the herringbone type grooves, a rotational speed and a linear feeding speed with respect to the sleeve are simultaneously applied to the tooling head, thereby forming the grooves that resemble the motion of the tooling head. When the sleeve is very small, manufacturing the grooves can be very difficult. It is generally acknowledged that the shape of the groove plays an important role in the establishment of the dynamic pressure. However, the difficulties in forming grooves restrain the commercially use of various grooves of complicated shape, even though these grooves have been experimentally proved to have advantages in the establishment of the dynamic pressure over the conventional grooves. Therefore, a heretofore-unaddressed need exists in the industry to address the aforementioned deficiencies and inadequacies.

SUMMARY OF THE INVENTION

The present invention, in one form thereof, provides a method of making a fluid dynamic bearing. According to one embodiment of the method, at least two bearing parts are firstly provided. Each of the bearing parts has its shape corresponding to a portion of the fluid dynamic bearing to be formed. Then, the bearing parts are combined to form a profile of the fluid dynamic bearing to be formed. Finally, the combined bearing parts are sintered to form an integral body. The fluid dynamic bearing is thus achieved.

DESCRIPTION OF PREFERRED EMBODIMENTS

Figure 1:
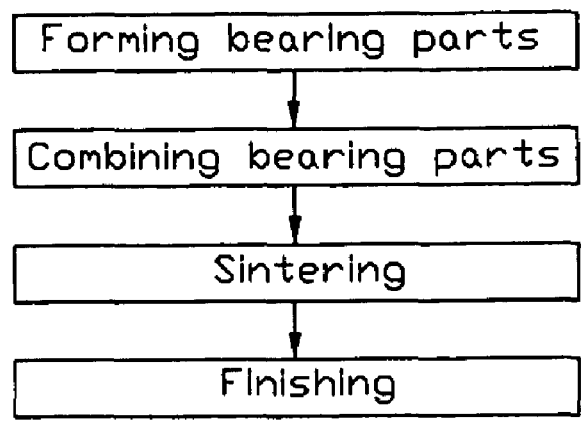
FIG. 1 is a process flow chart for making fluid dynamic bearings in accordance with preferred embodiments of the present invention.

Referring to FIG. 1, a method of making a fluid dynamic bearing in accordance with a preferred embodiment of the present invention mainly comprises the following steps:

Firstly, a plurality of bearing parts are formed independently by press molding raw materials. These bearing parts have their shapes corresponding to divided parts of the fluid dynamic bearing to be formed. This step will be detailed with reference to FIG. 3.

The second step is to combine the bearing parts together. In this step, the bearing parts are combined together to preliminarily form a profile of the fluid dynamic bearing to be formed. This step will be detailed with reference to FIG. 2.

Thirdly, the combination of the bearing parts is sintered. The bearing parts are thus joined permanently with one another to form an integral body. The fluid dynamic bearing is thus obtained.

FIGS. 2-5 illustrate the method of making a fluid dynamic bearing in accordance with a first embodiment of the present invention. For better understanding of the present invention, combining and sintering steps are described firstly.

Figure 2:
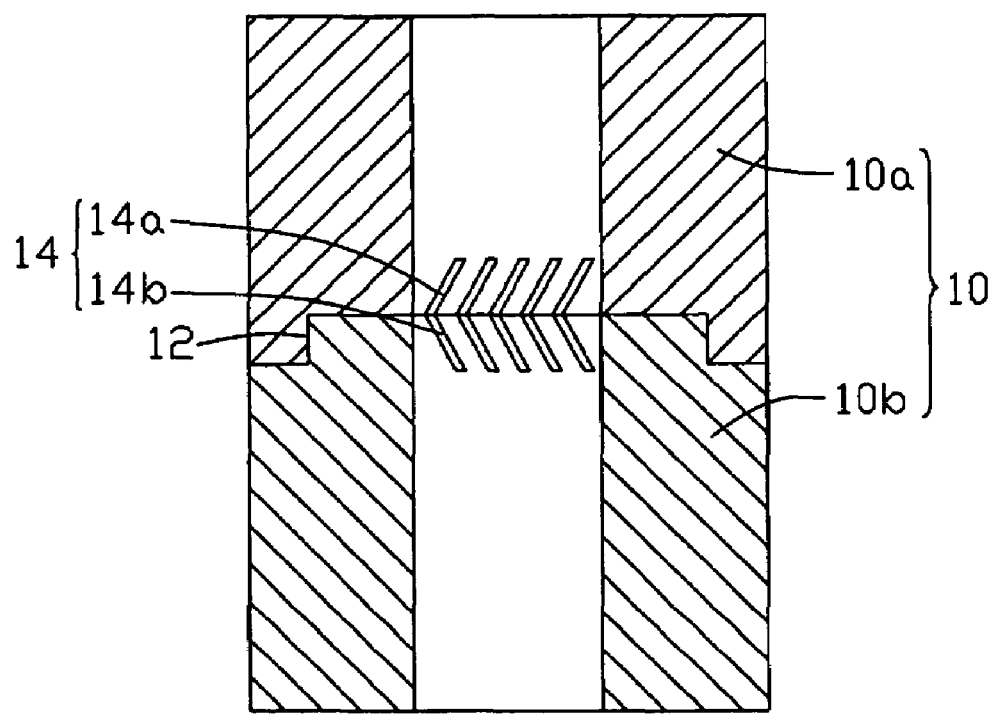
FIG. 2 is a cross sectional view showing two bearing parts of a fluid dynamic bearing being brought together in accordance with one preferred embodiment of the present invention.

Referring to FIG. 2, the combining step of the method is depicted. In the first embodiment, a fluid dynamic bearing 10 is comprised of a first bearing part 10a and a second bearing part 10b. The first and second bearing part 10a, 10b are axially joined together in the combining step, to preliminarily form the profile of the fluid dynamic bearing 10. The first and second bearing parts 10a, 10b have their shapes respectively corresponding to divided portions of the fluid dynamic bearing 10 that are divided axially. Each of the first and second bearing parts 10a, 10b comprises a joint plane 12 at one end thereof. For better alignment of the first and second bearing part 10a, 10b, the joint plane 12 is configured to have a step structure. Adhesive is applied on the joint plane 12 to bond the first and second bearing parts 10a, 10b together. Alternatively, the first and second bearing parts 10a, 10b may be preliminarily combined by cold isostatic pressing (CIP).

The fluid dynamic bearing 10 has a plurality of dynamic pressure generating grooves 14 (hereinafter referred to as "groove"). Each groove 14 is V-shaped, and has first and second groove branches 14a, 14b being angled to each other. The first groove branches 14a are inclined with respect to the joint plane 12 of the fluid dynamic bearing 10 with a same angle, and the second groove branches 14b are inclined with respect to the joint plane 12 of the fluid dynamic bearing 10 with another same angle. To form the grooves 14 of the fluid dynamic bearing 10, the first bearing part 10a forms a plurality of first groove branches 14a adjacent the joint plane 12, and the second bearing part 10b forms a plurality of second groove branches 14b adjacent the joint plane 12. When the first and second bearing parts 10a, 10b are combined, the first groove branches 14a communicates with corresponding second groove branches 14b at the joint plane 12, thereby forming the grooves 14 of the fluid dynamic bearing 10.

Figure 3:
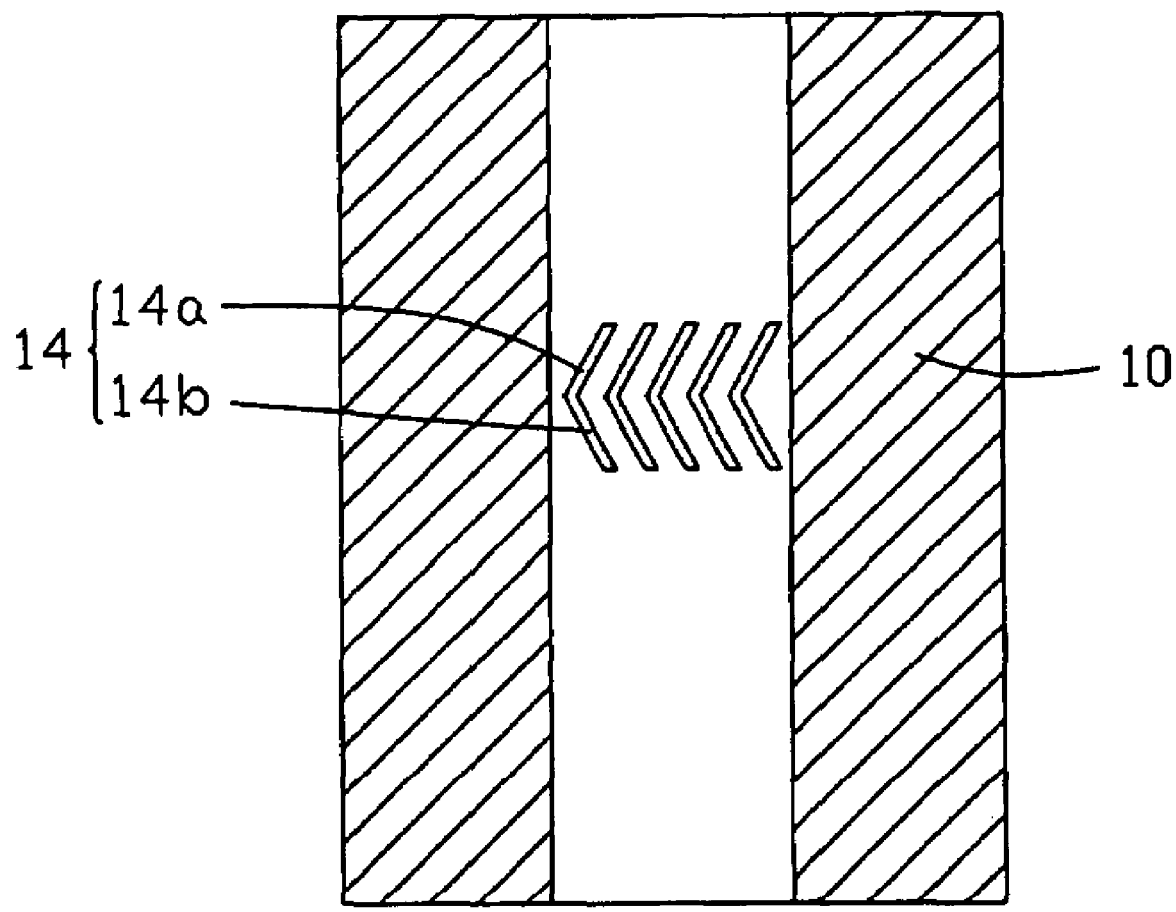
FIG. 3 is a cross sectional view showing a complete fluid dynamic bearing made up of the bearing parts of FIG. 2.

Referring to FIG. 3, the combination of the first and second bearing parts 10a, 10b is sintered at high temperature. By the sintering step, the adhesive vaporizes, and the joint plane 12 disappears. As a result, the first and second bearing parts 10a, 10b are permanently joined to form an integral body. The fluid dynamic bearing 10 having the grooves 14 is thus achieved.

Figure 4:
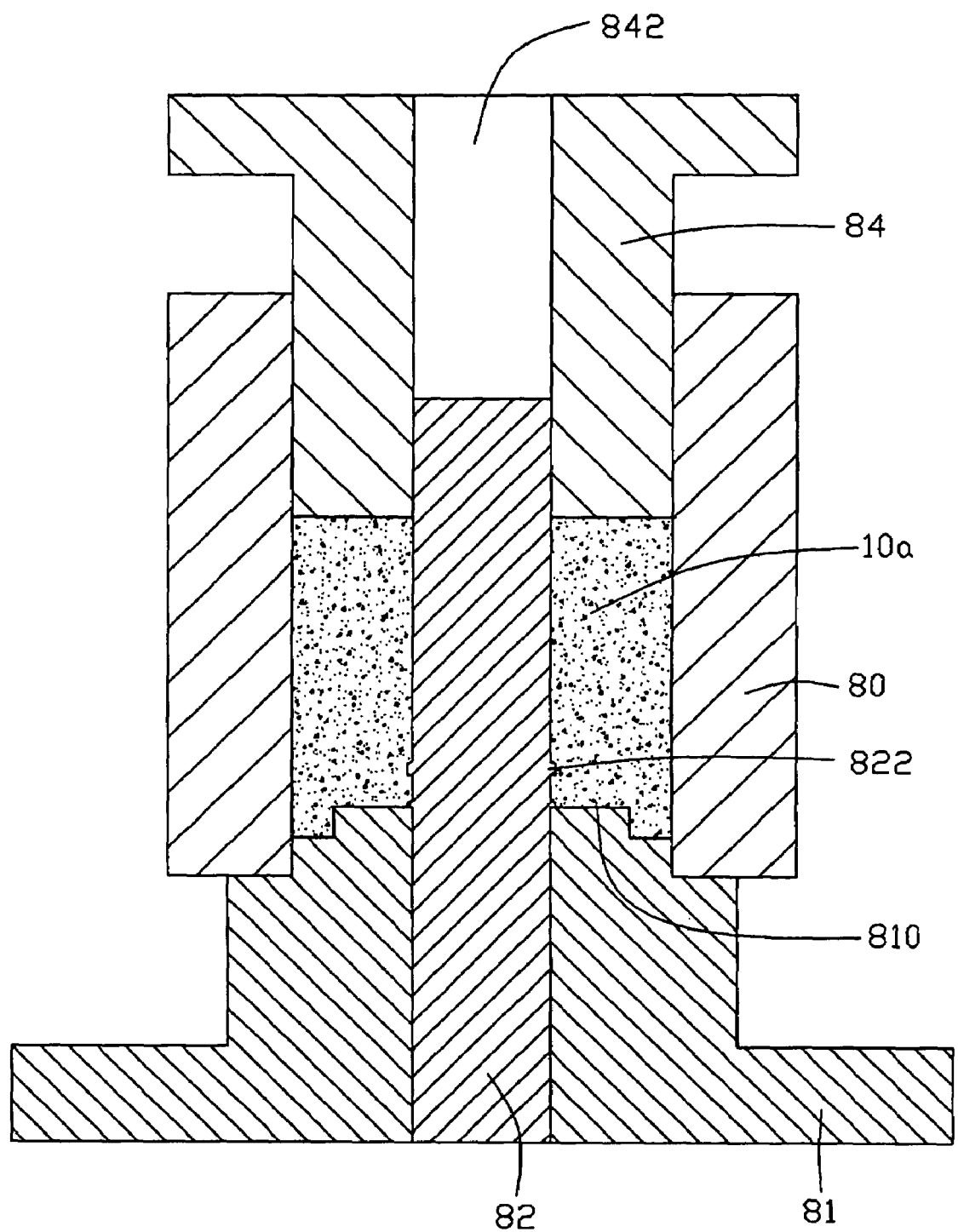
FIG. 4 is a cross sectional view showing a mold molding one of the two bearing parts of FIG. 2.
Figure 5:
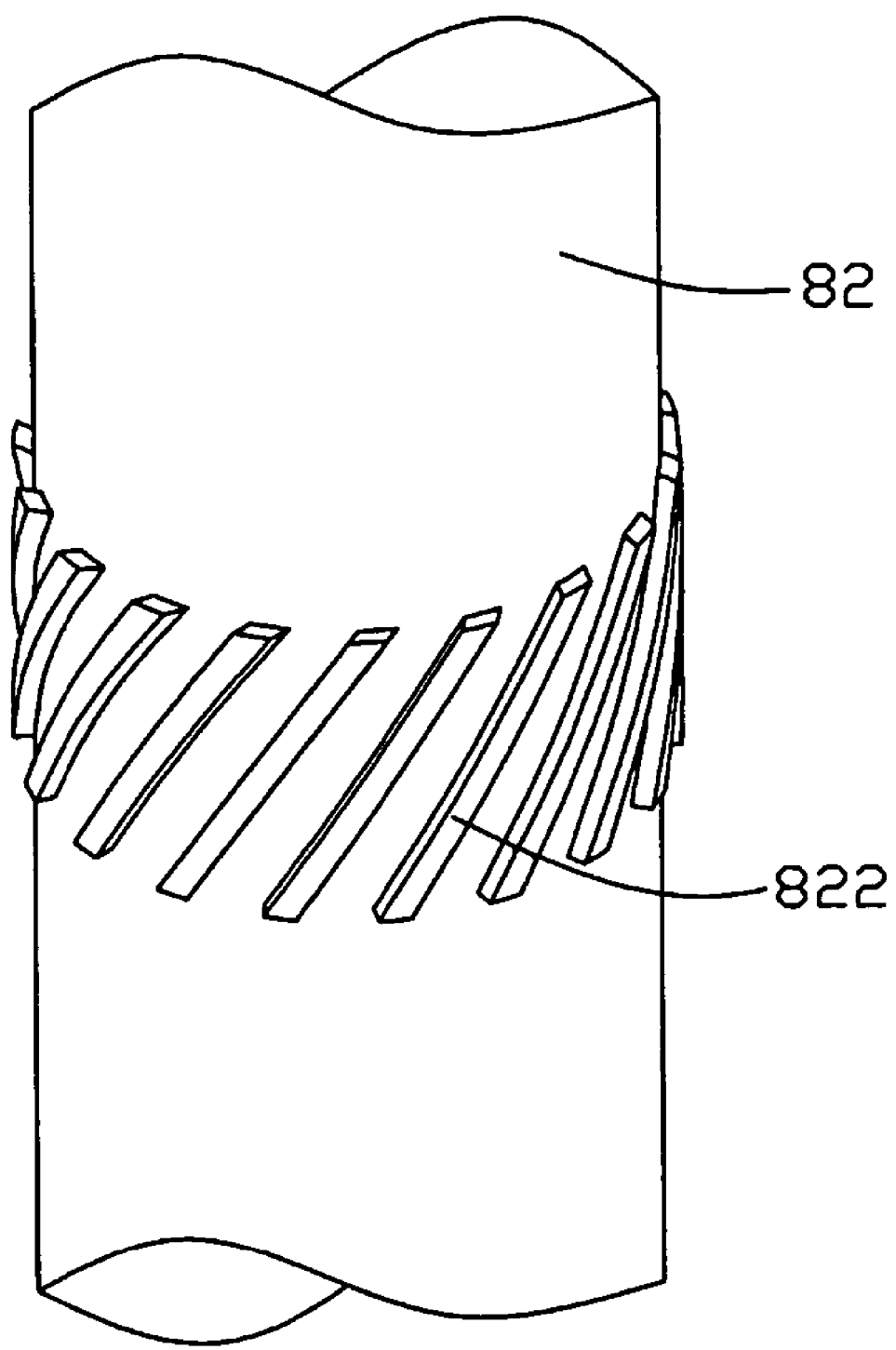
FIG. 5 is an enlarged isometric view showing a mandrel of the mold of FIG. 4.

Now please turn to FIGS. 4 and 5, which by way of example illustrate the process of the making the first and second bearing parts 10a, 10b.

Referring to FIG. 4, the first and second bearing parts 10a, 10b are formed by press molding. By way of example, FIG. 4 only illustrates the molding process of the first bearing parts 10a. It should be understood that the second bearing part 10b could be made in the same manner. The mold used comprises a hollow mold base 80, a lower mold 81 located at a bottom side of the mold base 80, and an upper mold 84 located at a top side of the mold base 80. The mold base 80 has a cylindrical inner hole having a diameter equal to an outer diameter of the bearing part 10a. The mold base 80 is enclosed by a top portion of the lower mold 81, which extends into the inner hole of the molding base 80. The top portion of the lower mold 81 comprises a step surface 810 to form the joint plane 12 of the bearing part 10a. The lower mold 80 further comprises a mandrel 82 extending into the inner hole of the molding base 80. The mandrel 82 is used to form an inner bore of the bearing part 10a. The upper mold 84 extends into the inner hole of the mold base 80, and axially defines therein a through hole 842. The mandrel 82 is movably received in the through hole 842. The mold base 80, the lower mold 81, the upper mold 84 cooperatively defines therebetween an annular space corresponding to the shape of the bearing part 10a. In molding, raw materials are supplied to this annular space, and the upper mold 84 presses the raw materials toward the lower mold 81. After the pressing process and thereafter a cooling process, the first bearing part 10a is obtained.

Referring to FIG. 5, the mandrel 82 of the lower mold 81 is described more detailedly. A plurality of ribs 822 is formed on an outer surface of the mandrel 82. The ribs 822 circumferentially surround the mandrel 82, and are inclined with respect to an axis of the mandrel 82 with a same angle. These ribs 822 are used to form the groove branches 14a of the first bearing part 10a. Therefore, the ribs 822 have their shape corresponding to the groove branches 14a. For sake of clarity, the ribs 822 are exaggeratingly shown in the drawing. As a matter of fact, a height of the ribs 822 could be as small as 10 microns.

Since the groove branches 14a are inclined with the same angle, the mandrel 82 can be withdrawn from the resultant first bearing part 10a in a rotational fashion. Alternatively, other manner to withdraw the post 82 is applicable. For example, by means of heating the resultant first bearing part 10a to expand the inner bore of the first bearing part 10a, the mandrel 82 then can be easily withdrawn therefrom.

Using the method described above, more than two bearing parts can be joined to form a fluid dynamic bearing, which will be described with reference to FIGS. 6 and 7.

Figure 6:
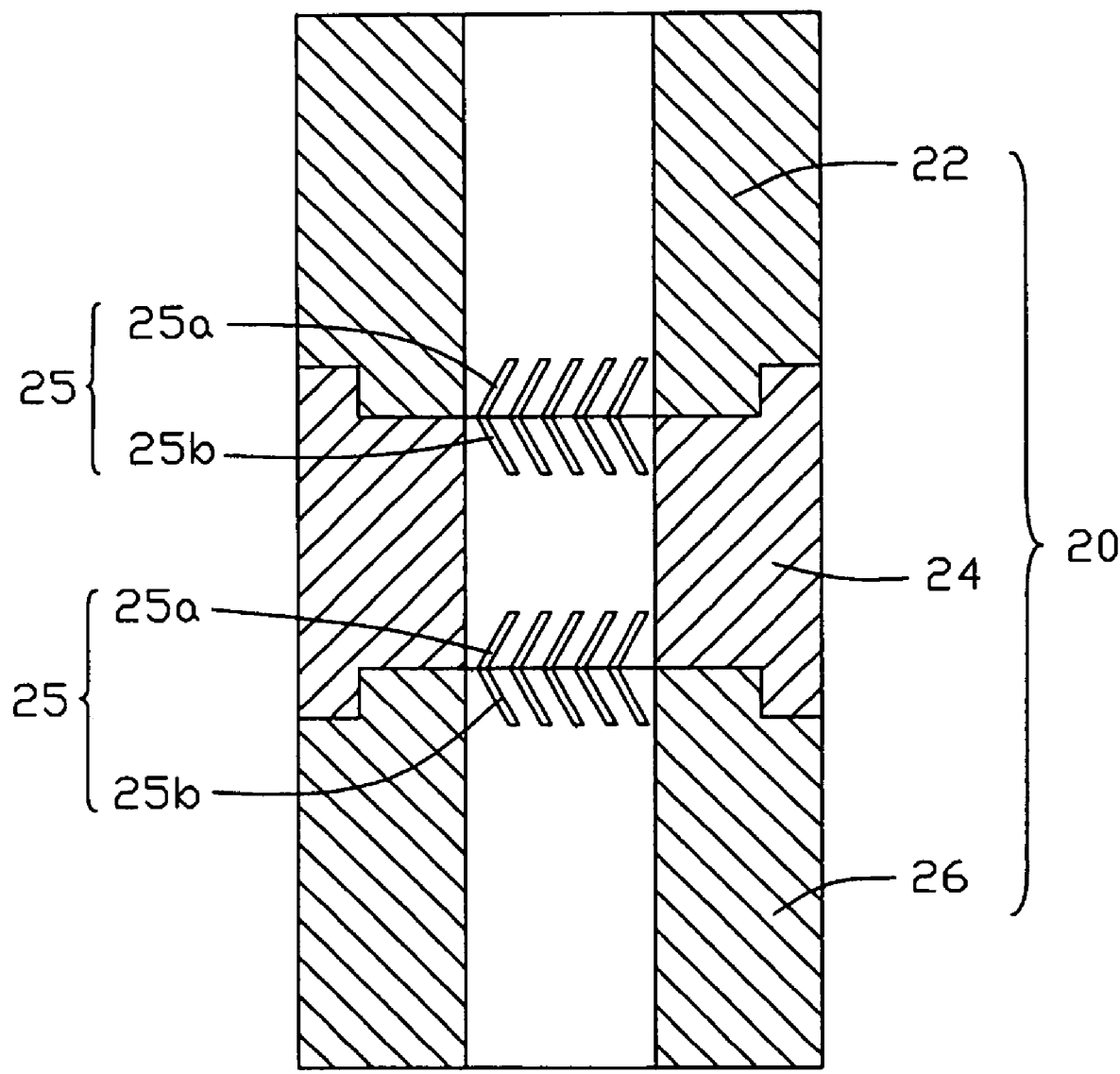
FIG. 6 is a cross sectional view showing three bearing parts of a fluid dynamic bearing being brought together in accordance with an alternative embodiment of the present invention.

Referring to FIG. 6, according to a second embodiment of the present invention, first, second and third bearing parts 22, 24, 26 are joined and sintered to form a fluid dynamic bearing 20. The first and third bearing parts 22, 26 each have a joint plane at one end thereof, and the second bearing part 24 has two joint planes respectively corresponding to the joint planes of the first and third bearing parts 22, 26. A plurality of first groove branches 25a is formed near the joint plane of the first bearing part 22. A plurality of second groove branches 25b is formed near one joint plane of the second bearing part 24. The first groove branches 25a of the first bearing part 22 and the second groove branches 25b of the second bearing part 24 cooperatively form V-shaped grooves 25. A plurality of first groove branches 25a is formed near the other joint plane of the second bearing part 24. A plurality of second groove branches 25b is formed near the joint plane of the third bearing part 24. The first groove branches 25a of the second bearing part 24 and the second groove branches 25b of the third bearing part 26 cooperatively form V-shaped grooves 25.

The first and third bearing parts 22, 26 can be manufactured using the mold described in the first embodiment. For manufacturing the second bearing part 24, the mandrel of the mold used in the first embodiment may be modified with reference to FIG. 7.

Figure 7:
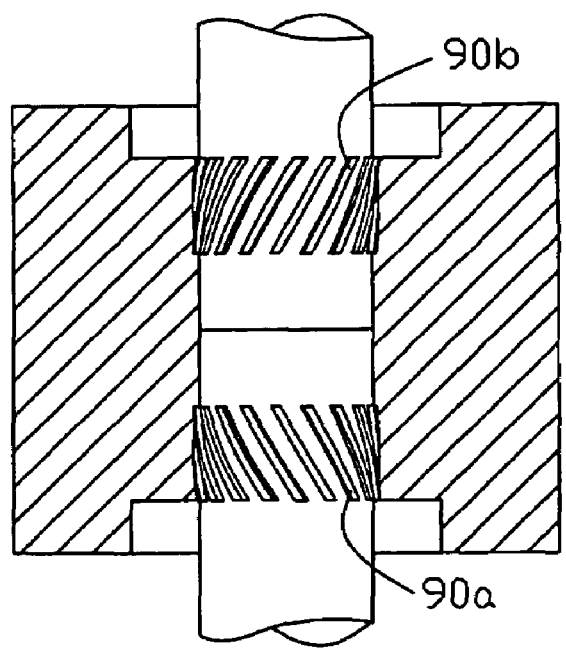
FIG. 7 is a cross sectional view showing a mandrel of a mold forming a second bearing part of the fluid dynamic bearing of FIG. 6.

Referring to FIG. 7, since the first and second bearing branches 25a, 25b are formed near end portions of the second bearing part 24, the mold used in the second embodiment comprises a mandrel having two pieces aligned axially. One piece forms a plurality of first ribs 90a corresponding to the first groove branches 25a, the other piece forms a plurality of second ribs 90b corresponding to the second groove branches 25b. In molding the second bearing part 24, after the second bearing part 24 is formed, the two pieces of the mandrel can be withdrawn from the second bearing part 24 in opposite directions.

Figure 8:
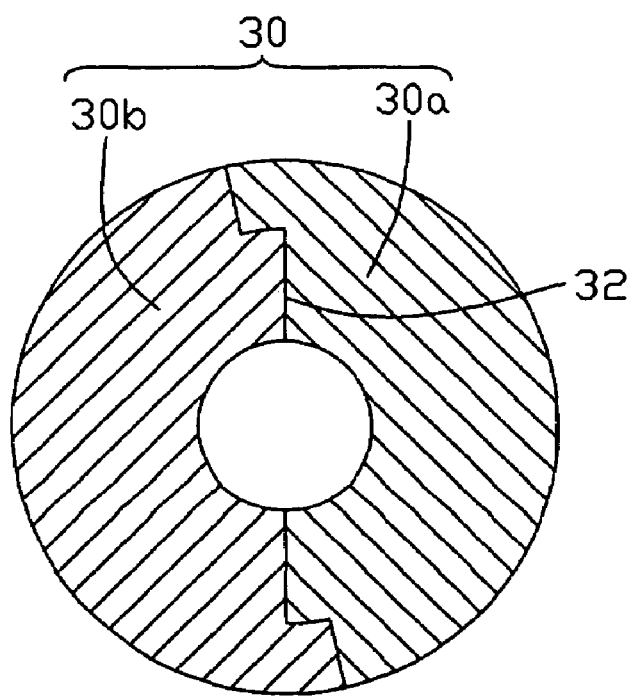
FIG. 8 is a cross sectional view showing two bearing parts of a fluid dynamic bearing being brought together in accordance with a further embodiment of the present invention.
Figure 9:
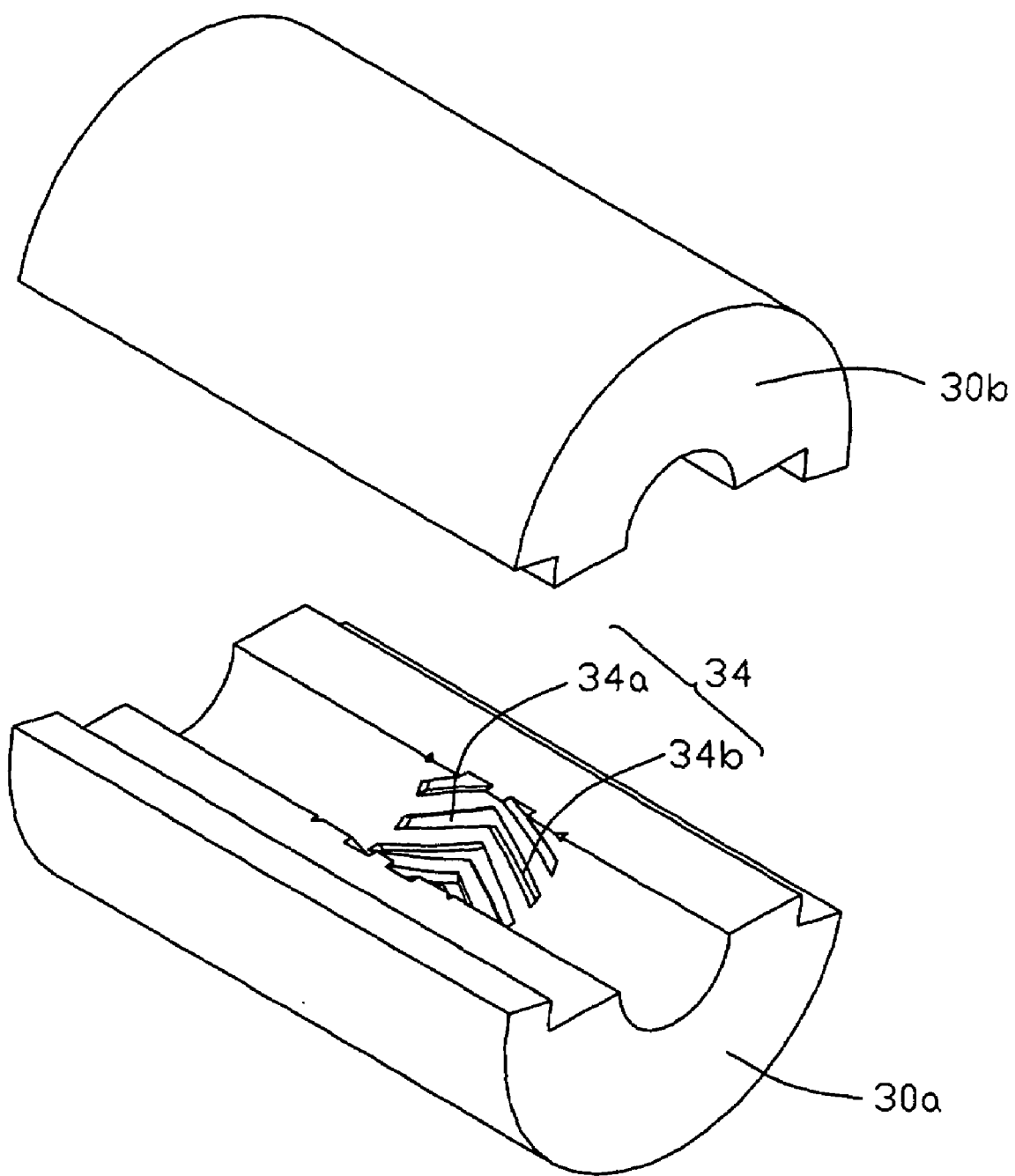
FIG. 9 is an exploded, isometric view of the fluid dynamic bearing of FIG. 8.
Figure 10:
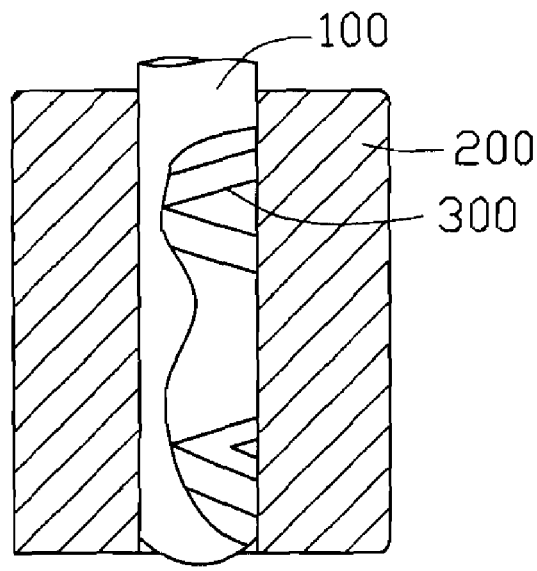
FIG. 10 is a cross sectional view showing a conventional fluid dynamic bearing assembly including a fluid dynamic bearing having herringbone type grooves and a rotary shaft.

Referring to FIGS. 8 and 9, according to a third embodiment of the present invention, a first bearing part 30a and a second bearing part 30b are combined and sintered to form a fluid dynamic bearing 30. The first and second bearing parts 30a, 30b have their shapes respectively corresponding to divided portions of the fluid dynamic bearing 30 that are divided generally through a diameter of the fluid dynamic bearing 30 along an axial direction thereof. Each of the first and second bearing parts 30a, 30b forms two joint planes 32 at two sides in a radial direction thereof. Each joint plane 32 has a step structure. The first and second bearing parts 30a, 30b are joined together at the joint planes 32. The fluid dynamic bearing 30 to be formed has a plurality of V-shaped grooves 34. Each groove 34 comprises a first groove branch 34a and a second groove branch 34b that are angled to each other. Each of the first and second bearing parts 30a, 30b forms a part of the first groove branches 34a and a part of the second groove branches 34b. After the first and second bearing parts 30a, 30b are combined, the first and second groove branches 34a, 34b cooperatively form the complete grooves of the fluid dynamic bearing 30.

Using the method of the third embodiment of the present invention, more than two bearing parts can be joined to form a fluid dynamic bearing.

Figure 11:
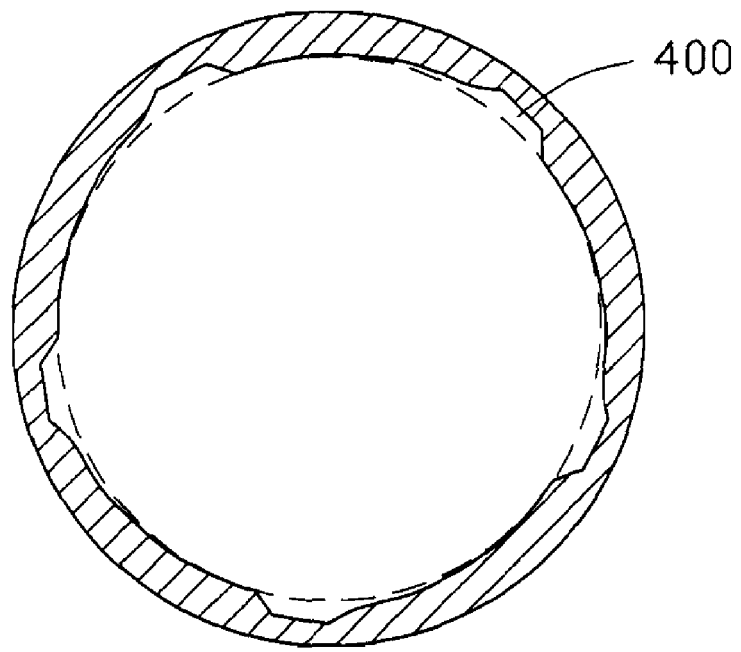
FIG. 11 is a cross sectional view showing a conventional fluid dynamic bearing having step type grooves.

In the above embodiments of the method of the present invention, each of the bearing parts forms a part of the grooves. Upon combining the bearing parts, these parts of the grooves are combined to complete V-shaped grooves. Using the method of the above embodiments, not only V-shaped grooves, but also grooves of various shapes, such as the step type grooves as shown in FIG. 11, can be formed.

In addition, since a groove having complicated shape usually can be divided into several simple groove branches or groove portions, by making these groove branches in different bearing parts and then combining these bearing parts, the complicated groove can be easily formed. Therefore, the method described in the above embodiments of the present invention has the capability of making such grooves of complicated shape.

Furthermore, the grooves need not a tooling machine to extend into the bore of the fluid dynamic bearing. Therefore, the present invention can easily deal with fluid dynamic bearings having small profiles.

We claim:

1. A method of making a fluid dynamic bearing, the fluid dynamic bearing having an inner peripheral surface with a plurality of dynamic pressure generating grooves formed therein, the method comprising the steps of:
   forming at least two bearing parts each comprising a joint plane and defining a part of the dynamic pressure generating grooves therein;
   combining the at least two bearing parts together with the joint planes contacting with one another to preliminarily form a profile of the fluid dynamic bearing having the dynamic pressure generating grooves therein; and
   sintering the combined at least two bearing parts to form an integral body to obtain the fluid dynamic bearing;
   wherein the fluid dynamic bearing has a cylindrical shape, the joint planes of each fluid dynamic bearing part are formed at two side thereof in a radial direction and extend along an axial direction of the fluid dynamic bearing, and the at least two bearing parts are joined with one another along a radial direction of the fluid dynamic bearing in the combining step.

2. The method of claim 1, wherein the joint plane is configured to have a step structure.

3. The method of claim 2, wherein the bearing parts are bonded together by adhesive on the joint planes in the combining step for preliminarily combining the at least two bearing parts together before the sintering step.

4. The method of claim 1, wherein the dynamic pressure generating grooves of the fluid dynamic bearing comprise a plurality of first groove branches and second groove branches, the first groove branches are angled to the second groove branches, each of the bearing parts has a part of the first groove branches and a part of the second groove branches.

5. A method of making a fluid dynamic bearing, comprising the steps of:
   providing at least two bearing parts, each of the at least two bearing parts having its shape corresponding to a portion of the fluid dynamic bearing to be formed;
   combining the at least two bearing parts to form a profile of the fluid dynamic bearing to be formed; and
   sintering the combined at least two bearing parts to form an integral body to thereby obtain the fluid dynamic bearing;
   wherein the at least two bearing parts have their shapes corresponding to radially divided parts of the fluid dynamic bearing and are joined with one another to form the fluid dynamic bearing.

6. The method of claim 5, wherein at least one of the at least two bearing parts forms at least a part of the dynamic pressure generating grooves therein.

7. The method of claim 6, wherein each of the at least two bearing parts forms a part of the dynamic pressure generating grooves therein, and in the combining step, the at least two bearing parts are joined such that the dynamic pressure generating grooves of the at least two bearing parts are combined to form the dynamic pressure generating grooves of the fluid dynamic bearing.

* * * * *